Figure 1:
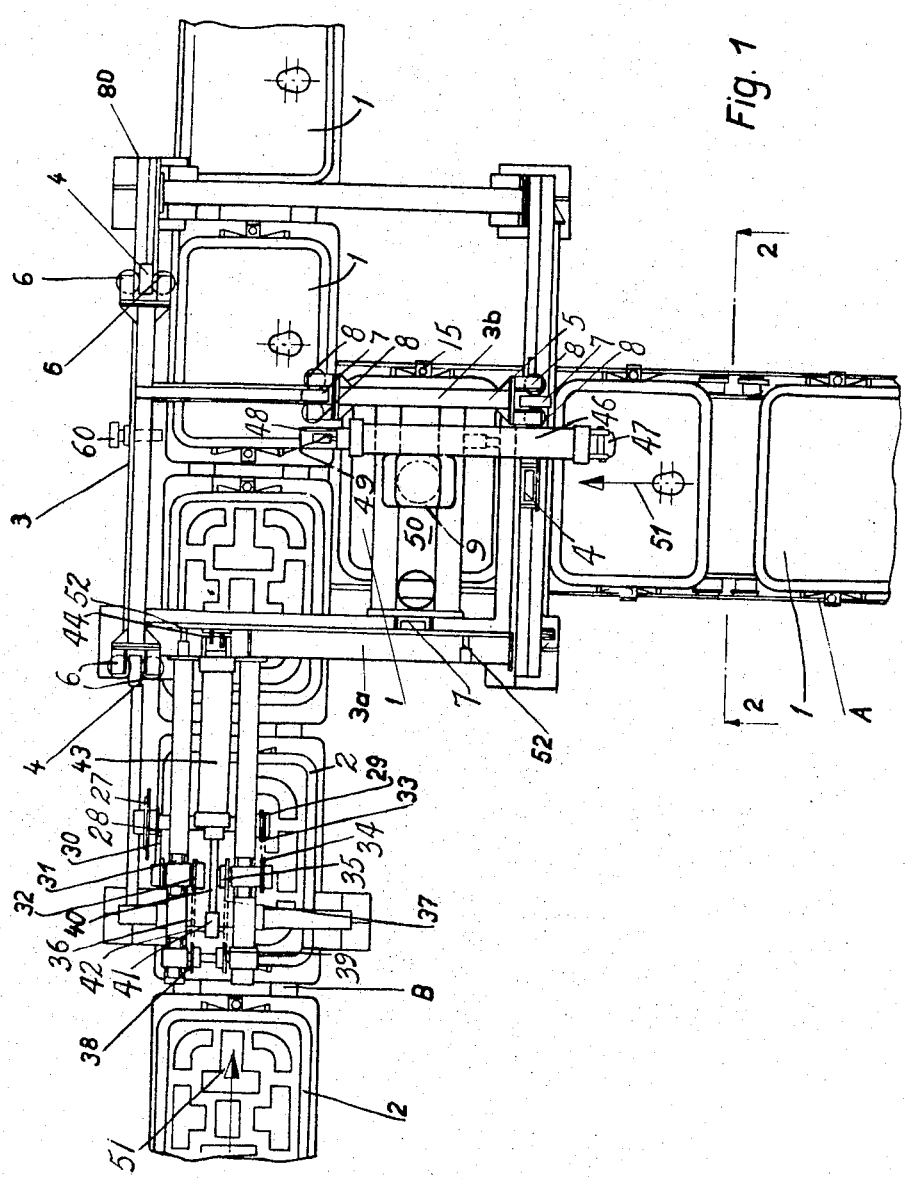

Sept. 5, 1967  E. BÜHRER ETAL  3,339,626
MOLD PART CONVEYING AND JUXTAPOSITIONING APPARATUS
Filed June 2, 1965  8 Sheets-Sheet 1

INVENTOR
ERWIN BÜHRER
MAX WERNLI
BY
ATTORNEYS

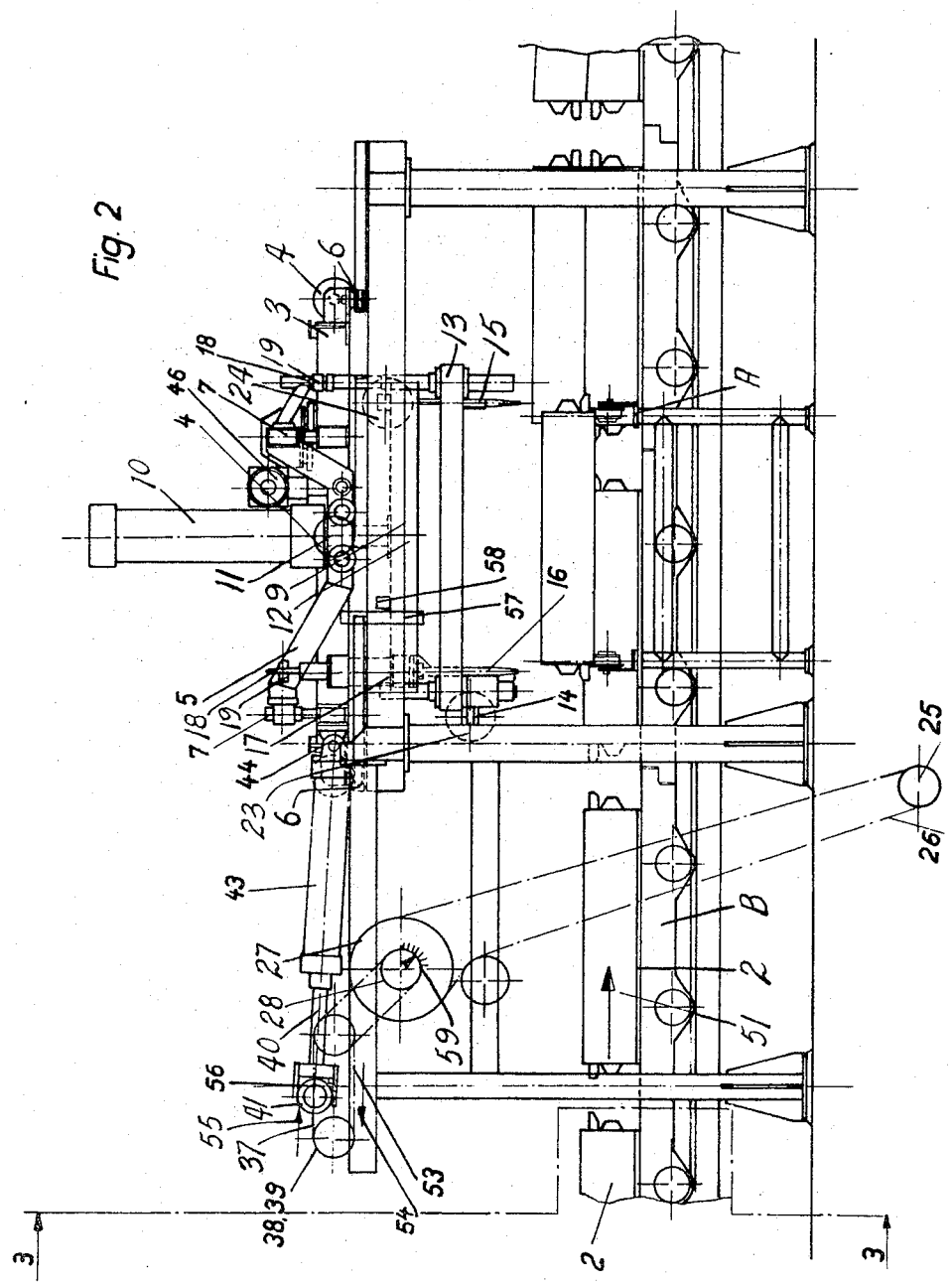

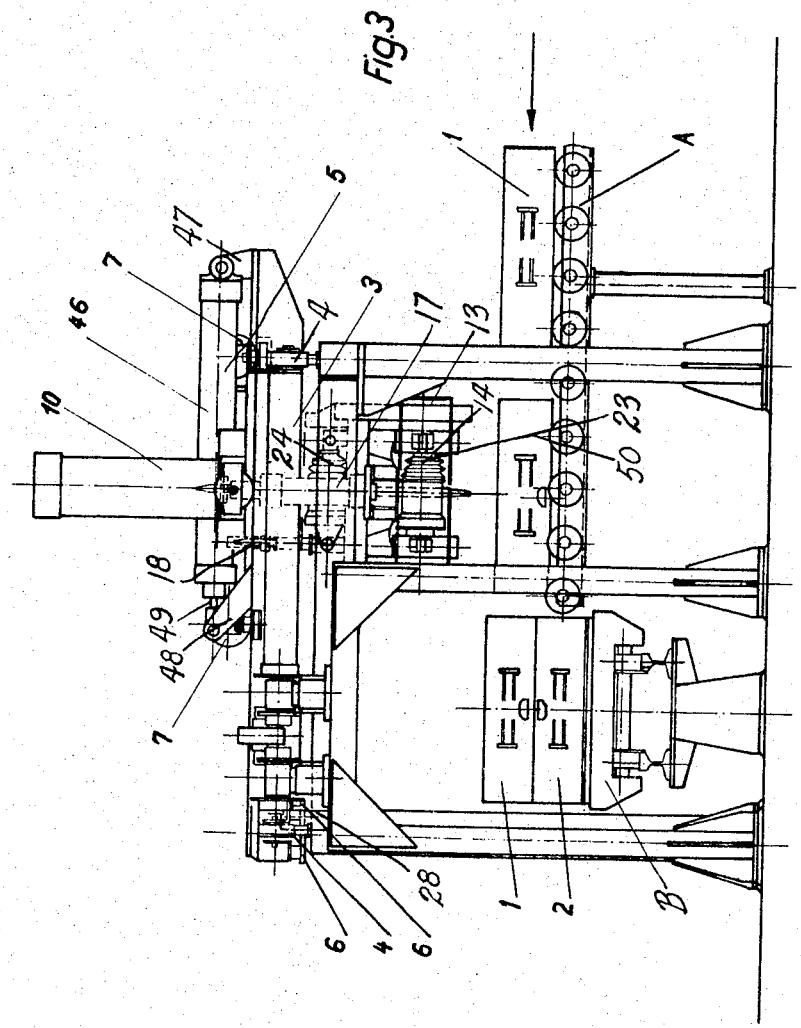

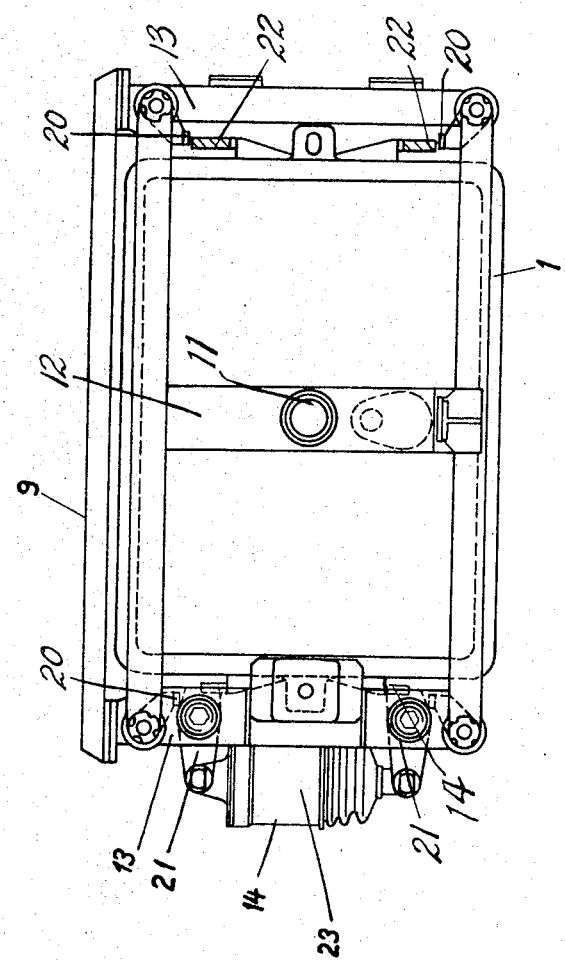

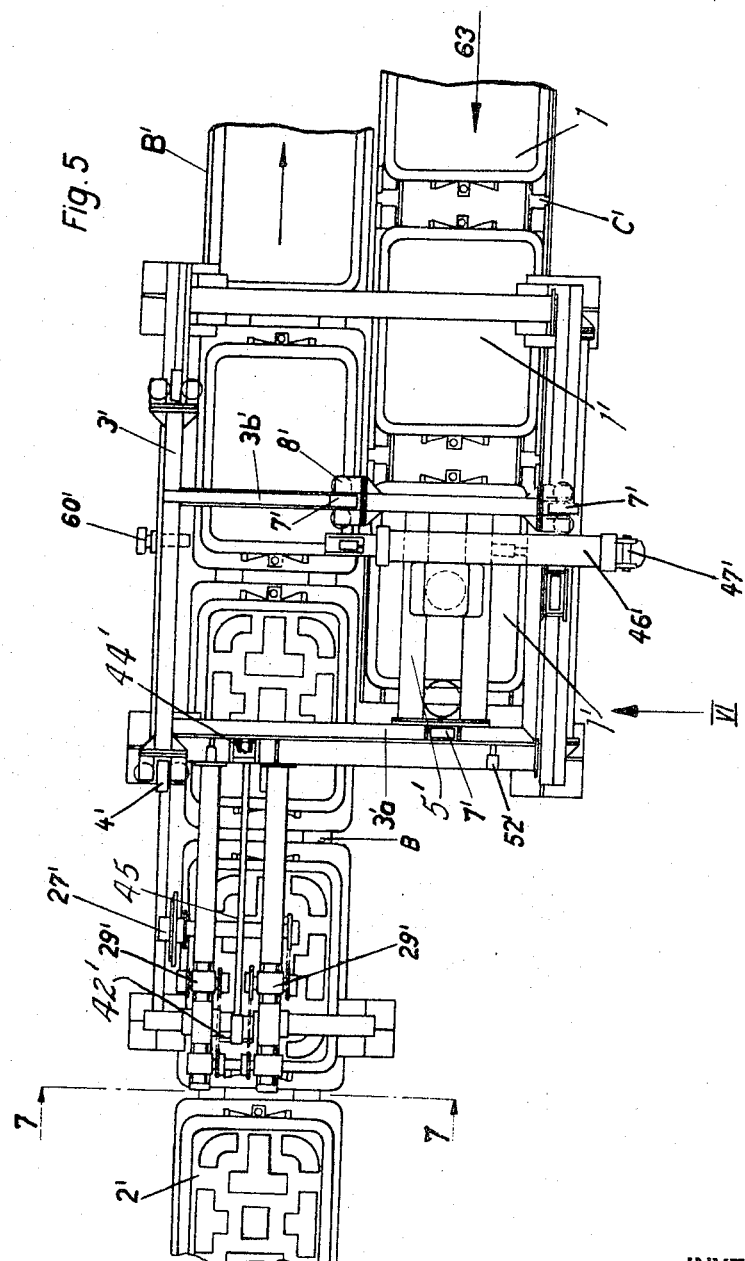

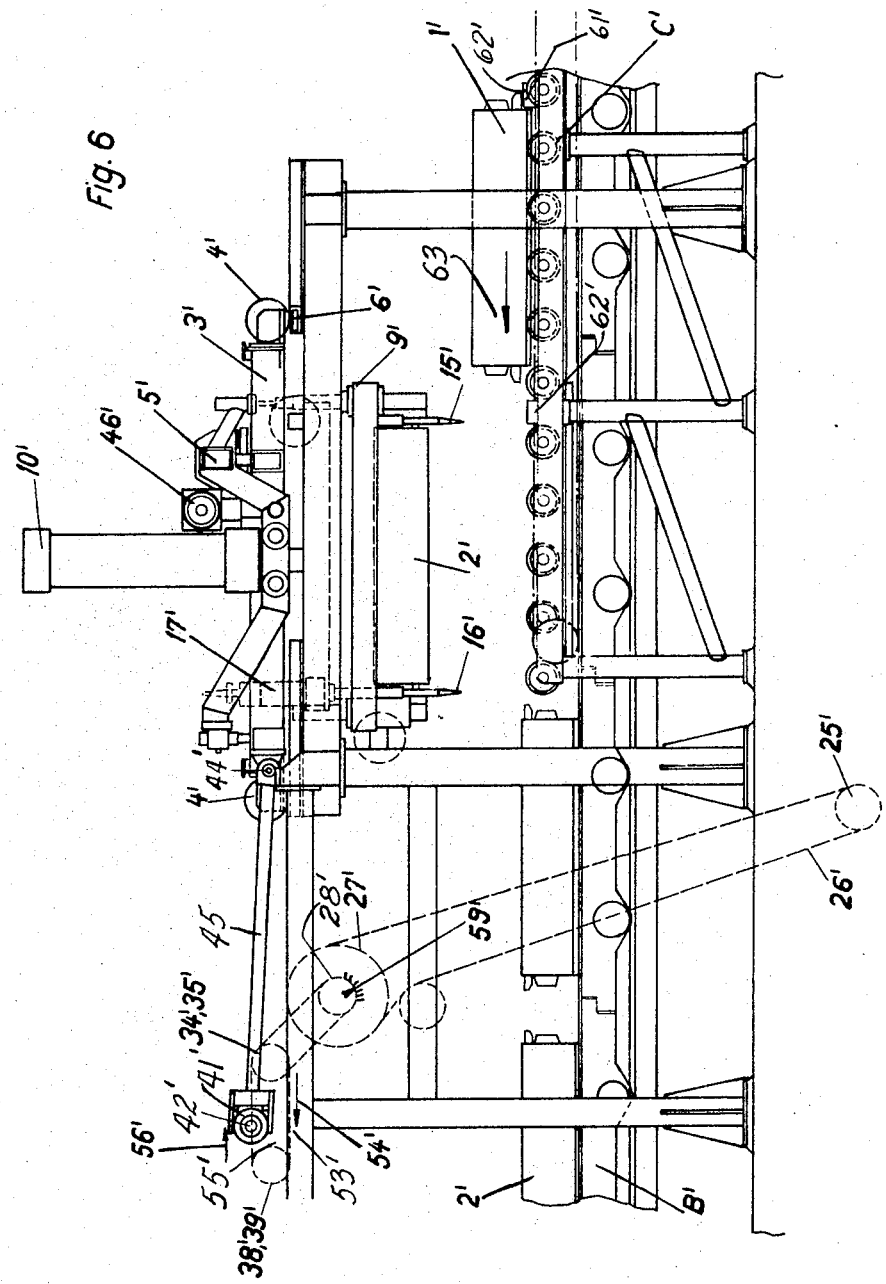

Sept. 5, 1967 E. BÜHRER ET AL 3,339,626
MOLD PART CONVEYING AND JUXTAPOSITIONING APPARATUS
Filed June 2, 1965 8 Sheets-Sheet 7
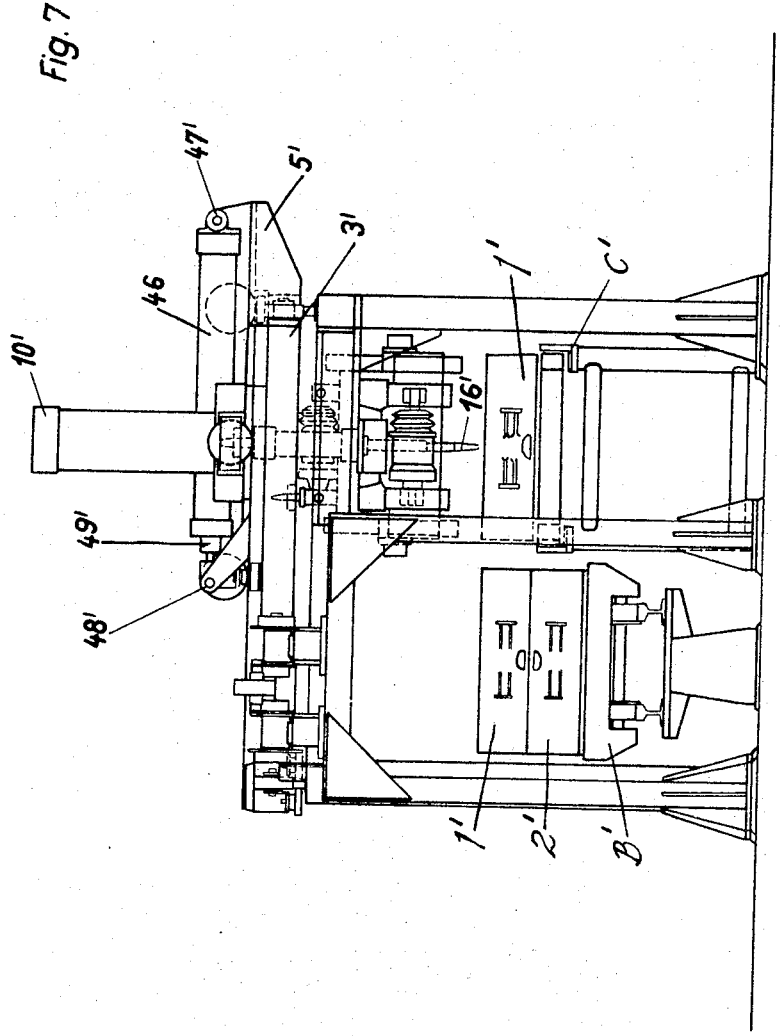
INVENTORS
ERWIN BÜHRER
MAX WERNLI
BY McGlew and Toren
ATTORNEYS

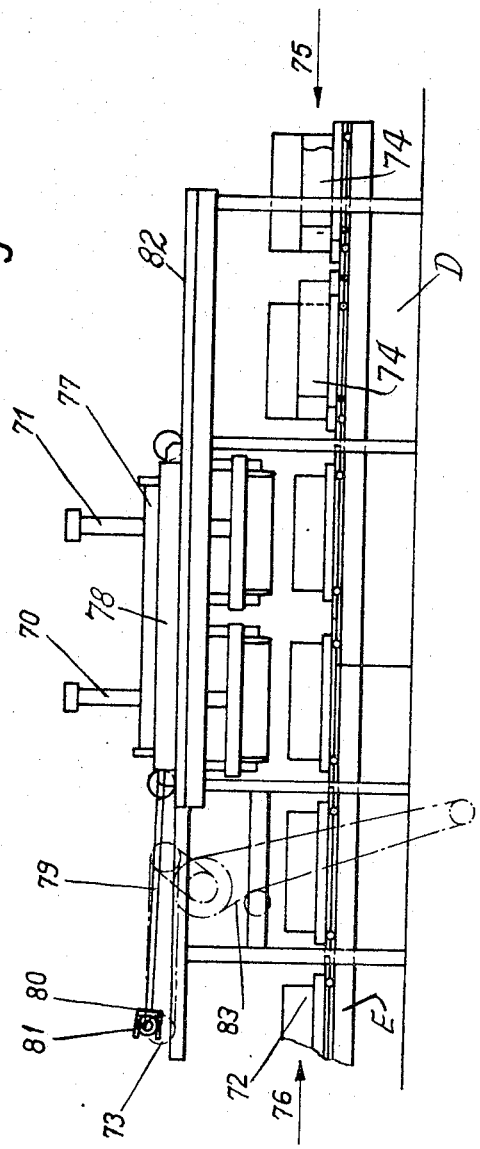

United States Patent Office 3,339,626
Patented Sept. 5, 1967

3,339,626
MOLD PART CONVEYING AND JUXTA-
POSITIONING APPARATUS
Erwin Bührer, Breitenaustrasse 164, Schaffhausen, Switzerland, and Max Wernli, Schaffhausen, Switzerland; said Wernli assignor to said Bührer
Filed June 2, 1965, Ser. No. 460,780
Claims priority, application Switzerland, June 5, 1964, 7,381/64
11 Claims. (Cl. 164—339)

This invention relates in general to casting mold transferring devices, and in particular to a new and useful device, and in particular to a new and useful device for automatically transferring and juxtapositioning two mold parts.

The present invention is an improvement over the prior art inasmuch as it provides means for automatically transferring mold parts or halves from one conveyor to another and for closing the molds so that they will be oriented in a correct position for casting. The developments in the technique of casting have resulted in an increase of the dimensions of the molds as well as in the number of molds that can be produced per hour. It is therefore no longer possible to transfer the molds by hand in modern plants. Prior to the present invention it was suggested to place lifted molds by means of turning gears on wheeled stands or tracks. Another suggestion concerned turnover devices for closing the molds. Most of these devices do not operate successfully in practice in all instances. They are particularly unsuitable if the molds are supplied in great numbers per hour and must be constantly transferred to moving conveyors because the capacity of such devices is limited.

In order to overcome the disadvantages of the prior art, the present invention provides an arrangement which includes a lifting device arranged on a movable girder which can be moved both in longitudinal directions parallel to the movement of a delivery conveyor and in directions transversely thereto. In a preferred arrangement, the girder is connected with an endless drive which imparts to the girder temporarily a speed corresponding to that of the delivery conveyor in order to transfer a mold part onto a complementary mold part which is carried by the delivery conveyor.

Accordingly, it is an object of the invention to provide an improved device for transferring casting molds in a continuous or semi-continuous manner.

A further object of the invention is to provide a device for association with a feeding conveyor adapted to feed a mold part or half which includes means for lifting a complementary part from an assembly or secondary conveyor advantageously feeding toward the primary feed conveyor. The mechanism includes a truck member or slidable member having a lifting element thereon for lifting a mold part and which is movable with the truck in a direction substantially parallel to the direction of movement of the feed conveyor for the purpose of permitting the mold part which is lifted to be aligned with a mold part on the primary feed conveyor and put in juxtaposition therewith.

A further object of the invention is to provide a device for transferring and placing together two mold parts in accurate alignment in a position of casting.

A further object of the invention is to provide a device for handling mold parts which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:
FIG. 1 is a partial top plan view of a mold transferring and juxtapositioning device constructed in accordance with the invention;
FIG. 2 is a partial end elevational view and sectional view taken along the line 2—2 of FIG. 1;
FIG. 3 is a sectional view taken along the line 3—3 of FIG. 2;
FIG. 4 is a top plan view of a gripping device indicated on an enlarged scale;
FIG. 5 is a view similar to FIG. 1 of another embodiment of the invention;
FIG. 6 is a partial front elevational view of the embodiment indicated in FIG. 5;
FIG. 7 is a partial sectional view taken along the line 7—7 of FIG. 5; and
FIG. 8 is a schematic side-elevational view of another embodiment of the invention.

Referring to the drawings in particular, the invention embodied therein in the embodiment of FIGS. 1 to 5, includes a feeding conveyor generally designated B along which are continuously fed lower mold parts 2 which, in accordance with the invention, are automatically provided with complementary mold parts 1 which are fed to the conveyor B by means of a conveyor A disposed at right angles thereto. In the embodiment illustrated, the mold parts 2 are lower mold parts and the mold parts 1 are upper mold parts. The lower mold parts include inserted cores.

In accordance with the invention, in an area overlying the juncture of the two conveyors A and B and extending along the feed direction of the conveyor B, there is provided a frame structure or frame generally designated 80. A girder or movable member 3 is movable along the frame 80 in directions parallel to the conveyor B on rollers 4, 4 which are arranged at respective ends thereof. Additional sets of lateral guide rollers 6, 6 at each end are provided for guiding the girder 3 during its longitudinal movement. A movable truck 5 is positioned on lateral extensions 3a and 3b of the movable girder 3 and can move transversely to the feed direction of the feed conveyor B. The truck 5 has rollers 8, 8 at respective ends thereof which ride over the lateral extensions 3a and 3b of the girder 3. The truck 5 carries a lifting or gripping device generally designated 9 which includes an actuating cylinder 10 which is connected at its opposite ends by control lines (not shown) to a source of control fluid for reciprocating a lifting piston (not shown) which is slidable therein for moving a piston rod 11 which extends downwardly therefrom and is connected at its lower end to a cross member 12 of the lifting device 9. The cross member 12 carries a frame 13 which is swingably suspended therefrom. The cylinder preferably works from a pressure fluid such as compressed air or liquid or may even be operated electrically.

The lifting device 9 advantageously includes gripping or clamping means for clamping a mold part such as the upper mold part 1, as indicated in FIG. 4. The gripping and clamping device 14 advantageously includes sets of levers 21, 21 at each end which are pivotal on the frame 13 to actuate clamping arms 22 for engaging the mold part 1. The levers are pivoted under the control of respective actuating cylinders 23 and 24 which are actuated by a control fluid supplied through conduits (not shown) either automatically or at a remote control location.

The lifting device also includes one or more flat dowel elements 15 and round dowel elements 16. The round dowel elements 16 are advantageously carried as a piston rod extension of a piston element (not shown) which is slidable in a cylinder 17 which is carried on the swinging frame 13. It has been found advantageous to provide means for raising and lowering the round dowel 16, but the flat dowel 15 may be fixed. Additional dowels or girders 18 and 19 are slidably guided in recesses defined in the swinging frame 13 and they are carried at their upper ends in the truck 5. The dowels 18 and 19 provide means for centering and locating the lifting device 9 in respect to the truck 5. Fixed stops 20, as indicated in FIG. 4, provide means for limiting the open position of the gripping levers 21, 21.

As indicated in FIG. 2, the lifting and juxtapositioning mechanism is driven from a driving sprocket 25 which is rotated by the same means (not shown) which drives the feed conveyor B for advancing the mold part 2 continuously in a timed manner. The conveyor A is advantageously similarly connected to be timed for moving the mold parts toward a station where they may be engaged by the lifting mechanism 9 and transferred to the feeding conveyor B. The driving sprocket 25 drives a sprocket 27 through a chain 26 and, as indicated in FIG. 1, the sprocket 27 is on a shaft carrying sprockets 28 and 29. The sprockets 28 and 29 in turn drive through respective chains 30 and 33 respective sprockets 31 and 34. The sprockets 31 and 34 are affixed to a common shaft with respective sprockets 32 and 35. It is advantageous that the sprocket 27 be connected to its associated shaft in a manner which will permit it to be adjusted angularly thereon for the purpose of adjusting the timing. Sprockets 32 and 35 drive, through chains 36 and 37, respectively, sprocket wheels 38 and 39, respectively, which are on a common shaft. The chains 36 and 37 which are guided about the sprocket wheels 32 and 38 and 35 and 39, respectively, move at circumferential speeds which correspond to the speed of the conveyor B. The chains 36 and 37 form an endless drive which can be designed, for example, as a perforated steel belt.

A piston rod 40 is carried at its outer end on a bearing 41 which pivotally engages a cross pin 42 which is carried between the chains 36 and 37 and advanced by movement thereof. The piston rod 40 is connected to a piston (not shown) which is slidable in a cylinder 43 which, in turn, is pivoted on lateral extension 3a of slidable girder 3. The piston rod 40 and the cylinder 43 will be moved by the continuous motion of the pin member 42 during the rotation of the sprocket chains 36 and 37 to cause the to and fro displacement of the girder 3 in directions parallel to the feed direction of the conveyor B. The movement of the piston rod 40 in respect to the cylinder 43 permits the holding of the truck 5 in a stationary position during portions of the operating cycle. In addition, it is sometimes advantageous to superimpose additional movements on the girder 3 by adding control fluids to respective opposite ends of the cylinder 43 through conduits (not shown).

Movement transverse to the direction of advance of the feed conveyor B is accomplished by a cylinder 46 which is pivoted on the truck 5 at the location of a support member 47. A piston rod 49, connected at one end to a piston (not shown) which is slidable in the cylinder 46, is pivoted at its opposite end to a support member 48 on the girder 3. Fluid is admitted to respective opposite sides of the piston (not shown) which is slidable in the cylinder 46 through conduits (not shown) in order to effect a displacement of the truck relative to the girder 3. An adjustable stop 60 arranged on the girder 3 limits the path of movement of the truck in a direction toward the conveyor B. By adjusting the stop 60 it is possible to adjust the position in which the gripping device will be lowered downwardly over the conveyor B for the purposes of determining the accurate positioning of the top mold part 1 on the lower mold part 2. Suitable switch means (not shown) are advantageously carried on the truck for effecting actuation on the cylinder 10 when the truck is in a position overlying the conveyor B in order to lower the lifting mechanism 9.

The operation of the device of FIGS. 1 to 5 is as follows:

The lower mold parts 2 are advantageously fed along the feed conveyor B at a continuous rate. The upper mold parts are advantageously fed along the conveyor A in substantially equal time intervals in a manner such that a mold part 1 is fed to a pick-up station defined at the location 50 in a position for being picked up by the lifting device for transfer to the conveyor B. The advance of the mold parts 2 on the conveyor B is indicated by the arrow 51. After the lifting device has been moved to a position at which it extends outwardly from the girder 3 and overlies the conveyor A, the lifting device is moved downwardly by actuating the cylinder 10. The swinging frame 13 is centered in respect to the mold portion 1 by means of the flat dowel 15 and the round dowel 16. This is advantageously accomplished by engagement of these parts in complementary portions defined on the mold parts. Means are then provided for actuating the control cylinders 23 and 24 of the lifting device for causing the clamping levers to engage the mold parts. After clamping, control means (not shown) are actuated to energize the cylinder 10 to cause the lifting of the lifting device 9 which is then moved upwardly into juxtaposition with the truck 5 and is centered in respect thereto by the dowels 18 and 19. Control means (not shown) are then actuated to energize the cylinder 46 to move the truck 5 backwardly toward the girder 3 from the position indicated in FIG. 1 to a position in which it overlies the conveyor B. The girder 3 is retained during this time at stops 52 in the position indicated in FIG. 1. This is made possible by the fact that the cross pin 42 moves with the bearing 41 on a revolving chain 37 in the direction of the arrow 54 on the return section 53 to cause the piston rod 40 to move out of the cylinder 43 while the cylinder 43 is maintained stationary. During the transverse movement of the truck 5 into the position above the conveyor B, the cross pin 42 moves about the chain wheels 38 and 39. Shortly before the cross pin 42 moves into the advance section 55 in the direction of the arrow 56 in synchronism with the conveyor B, the rod 40 is moved outwardly to cause the girder 3 to be advanced along the conveyor B in the direction of the arrow 51. The movement is at the same speed and in the same direction as the advance of the molds 2 on the conveyor B. This causes the movement of the upper mold half 1 in a manner such that it comes to lie above the respective lower mold 2. Control means (not shown) are then actuated to cause the piston (not shown) in the cylinder 10 to be moved downwardly to move the lifting device 9 downwardly and to move the dowels 18 out of the guide 19. The swinging frame 13 is then permitted to move freely until the flat dowel 15 and the round dowel 16 center the respective upper mold half 1 over the lower mold half 2. The upper mold half 1 is advantageously manufactured so that it protrudes over the edge of the lower mold half 2. An electric valve (not shown) is controlled by means of a cam 58 secured on the lifting device 9 and by an electric switch (not shown) so that the upper part 1 will come to lie on the lower part with the desired contact pressure when the pressure in the cylinder 10 is reduced such as to atmosphere. Preferably cushioning devices are arranged in the cylinder 10 to reduce the raising and lowering speed, respectively, before the end position is reached.

In the embodiment indicated in FIGS. 5 to 7, parts which are similar to those indicated in the first embodiment are similarly designated but with primes added. In this embodiment, conveyor C' is disposed alongside and parallel to conveyor B' but the feed direction of the conveyor C indicated by the arrow 63 is opposite to the feed direction of the conveyor B'. The upper mold portions 1 are moved in the direction of the arrow 63 by means of a drag chain 61 provided with traverses 62. A bar 45 connects a cross pin 42' with the journal 44'. Unlike the embodiment of FIGS. 1 to 4, the mold parts 1' are engaged by the lifting device 9' when they are being moved. This is made possible by the fact that the cross pin 42' imparts to the girder 3' on the return section 53 through the connection rod 45 a velocity in the direction of the arrow 63 corresponding to the conveyor C'. The remaining operation of gripping the mold 1' and tranferring it over to the conveyor B' and depositing it on the mold portion 2' is similar to that of the embodiment of FIGS. 1–4 with the difference, however, that both the gripping device 9' and the mold 1' on the conveyor C' are moved during the gripping. The gripping device 9' is lowered to grip the mold when the position of FIG. 7 is reached, and thereafter cylinder 46' is actuated to shift the truck 5 over the conveyor B'. This occurs as the cross pin 42' is moved from the return section 53' into the advance section 55'. During the movement of the cross pin 42' on the advance section 55' the mold 1' is deposited on the mold part 2' and the empty gripping device 9' is lifted. During the revolution of the cross pin 42' from the advance section into the return section 53', the truck 5 is displaced transversely into the position in which it overlies the conveyor C'.

In the embodiment indicated in FIG. 8 which is somewhat schematically indicated, there are shown two lifting devices 70 and 71 which are connected with a revolving driving means 73. In this embodiment, a conveyor D is indicated which feeds upper part 74 of molding boxes in substantially equal time intervals in the direction of the arrow 75. A conveyor E feeds lower parts 72 in the direction of the arrow 76 at substantially equal time intervals. The two lifting devices 70 and 71 are secured on a girder 77 and the girder 77 is arranged on a truck 78 for transverse displacement along the two parallel conveyors. On the truck 78 there is articulated a connecting rod 79 whose end 80 is pivoted to a cross rod 81 which is carried on a chain conveyor of the conveyor system schematically indicated at 73. The rod 81 will be displaced longitudinally in each direction as in the other embodiment. The operation is substantially the same as in the other embodiments, with the difference that two mold parts are lifted at one time and transferred at the same time. Of course, any number of molds may be handled by a similar number of lifting devices which may be applied to apply one, two or more mold halves to a corresponding number of lower mold parts. The apparatus of the invention permits the transfer of a great number of mold parts in a short period of time independent of whether the molds are larger or heavy or whether they are supplied at high speed. The transfer is substantially shock-less so that there is no damage to the mold. The apparatus is simple in design and requires therefore no more maintenance and attendance than other foundry machines, particularly molding machines.

While specific embodiments of the invention have been shown and described in detail to illustrate the application of the inventive principles, it will be understood that the invention may be embodied otherwise without departing from such principles.

What is claimed is:

1. A mold part conveying and juxtapositioning device comprising means for continuously moving a first mold part along a feed path, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path at substantially the same speed as said first mold part is moved to position said mold part carried by said lifting device on said mold part being conveyed on said feed path.

2. A mold part conveying and juxtapositioning device comprising means for continuously moving a first mold part along a feed path, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path at the same speed as said first mold part is moved to position said mold part carried by said lifting device on said mold part being conveyed on said feed path, and dowel means carried by said lifting device engageable with receiving elements defined on said mold part being conveyed on said feed path for centering said mold part carried by said lifting device on the mold part being conveyed along said feed path.

3. A mold part conveying and juxtapositioning device comprising means for continuously moving a first mold part along a feed path, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path and means for moving said truck along said feed path at the same speed as said first mold part is moved to position said mold part carried by said lifting device on said mold part being conveyed on said feed path, said lifting means including at least one frame element engageable around said mold parts, and gripper means carried by said frame element for gripping said mold part centrally within said frame element.

4. A mold part conveying and juxtapositioning device comprising means for continuously moving a first mold part along a feed bath, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path at the same speed as said first mold part is moved to position said mold part carried by said lifting device on said mold part being conveyed on said feed path, said lifting means including at least two separate frame elements for engaging simultaneously at least two seperate mold parts, said frame elements being arranged in side by side spaced relationship.

5. A mold part conveying and juxtapositioning device comprising means for continuously moving a first mold part along a feed path, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path at the same speed as said first mold part is moved to position said mold part carried by said lifting device on said mold part being conveyed on said feed path, said means for shifting said truck from said feed path to said assembly path and from said assembly path to said feed path including a cylinder carried on said truck and a piston slidable in said cylinder and pivotally connected to said frame.

6. A mold part conveying and juxtapositioning device comprising means for conveying a first mold part along a feed path, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path as said mold part carried by said lifting device is positioned on said mold part being conveyed on said feed path, said means for shifting said truck when it overlies said feed path in the direction of feed of the mold part moved therealong including a conveyor adapted to be connected to said means for conveying mold parts along said feed path for operation in timed relation thereto, a pin member connected to said conveyor and movable through an endless path by said conveyor, and a member pivotally connected to said pin member and to said truck for shifting said truck as said pin member is moved by said conveyor.

7. A mold part conveying and juxtapositioning device comprising means for conveying a first mold part along a feed path, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path as said mold part carried by said lifting device is positioned on said mold part being conveyed on said feed path, said means for moving said truck when it overlies said feed path in the direction of feed of the mold part moved therealong including a conveyor adapted to be connected to said means for conveying mold parts along said feed path, a pin member connected to said conveyor and movable through an endless path by said conveyor, a fluid piston carried by said truck and pivotally connected thereto at its one end, a piston slidable in said cylinder and having a rod portion extending outwardly from the opposite end of said fluid piston pivotally connected to said pin member.

8. A mold part conveying and juxtapositioning device comprising means for conveying a first mold part along a feed path, means for continuously moving a second mold part along an assembly path at an angle to said feed path and joining said feed path, a frame overlying a portion of each of said feed path and said assembly path at the juncture thereof, a truck movable on said frame between said feed path and said assembly path and also being movable in a direction parallel to and overlying said feed path, means for shifting said truck when it overlies said feed path to a position overlying said assembly path, a lifting device carried on said truck movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path at the same speed as said mold part is moved to position said mold part carried by said lifting device on said mold part being conveyed on said feed path.

9. A mold part conveying and juxtapositioning device comprising means for continuously moving a first mold part along a feed path, means for conveying a second mold part along an assembly path alongside and parallel to said first feed path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck and having means for lifting at least one mold and being movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path at the same speed as said first mold part is moved to position said mold part carried by said lifting device on said mold part being conveyed on said feed path.

10. A mold part conveying and juxtapositioning device comprising means for continuously moving a first mold part along a feed path, means for conveying a second mold part along an assembly path, a frame overlying a portion of each of said feed path and said assembly path, a truck movable on said frame between said feed path and said assembly path and also being movable in a direction parallel to and overlying said feed path, means for shifting said truck when it overlies said feed path to a position overlying said assembly path, a lifting device carried on said truck having means for lifting at least two molds movable downwardly to said assembly path to engage a mold part thereon and upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path at the same speed as said first mold part is moved to position said mold part carried by said lifting device on said mold part being conveyed on said feed path.

11. A mold part conveying and juxtapositioning device comprising means for conveying a first mold part along a feed path, means for conveying a second mold part along an assembly path parallel to said feed path, a frame overlying a portion of each of said feed path and assembly path, a truck movable on said frame between said feed path and said assembly path and also being movable in a direction parallel to and overlying said feed path, means for shifting said truck when it overlies said feed path to a position overlying said assembly path, a lifting device carried on said truck having a pivotal lifting frame engageable around a mold part and being movable downwardly to said assembly path, gripper means on said frame to engage a mold part, said lifting device being movable upwardly to lift the mold part, means for shifting said truck from said assembly path to said feed path and for shifting said truck along said feed path in the direction of feed of the mold parts on said feed path, said lifting device being movable downwardly onto said feed path to position the mold part which is lifted thereby onto the mold part being conveyed on said feed path, and means for moving said truck along said feed path as said mold part carried by said lifting device is positioned on said mold part being conveyed on said feed path including a conveyor adapted to be connected to said means for conveying mold parts along said feed path connected to said conveyor, a pin member connected to said conveyor and movable through an endless path by said conveyor and a member pivotally connected to said pin member and to said truck for shifting said truck as said pin member is moved by said conveyor.

References Cited

UNITED STATES PATENTS

| 2,259,728 | 10/1941 | Bridges | 214—1 X |
| 2,961,810 | 11/1960 | Johnson et al. | 214—6 |
| 2,985,926 | 5/1961 | Fellows | 22—31 X |
| 3,017,675 | 1/1962 | Young | 164—339 X |

FOREIGN PATENTS

| 1,050,511 | 2/1959 | Germany. |
| 860,044 | 2/1961 | Great Britain. |

J. SPENCER OVERHOLSER, *Primary Examiner.*

E. MAR, *Assistant Examiner.*